United States Patent
Takeuchi et al.

(10) Patent No.: US 12,415,921 B2
(45) Date of Patent: Sep. 16, 2025

(54) EPOXY RESIN COMPOSITION AND CURED PRODUCT THEREOF

(71) Applicant: SUMITOMO CHEMICAL COMPANY, LIMITED, Tokyo (JP)

(72) Inventors: Kenichi Takeuchi, Osaka (JP); Hirofumi Kato, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 496 days.

(21) Appl. No.: 17/927,561

(22) PCT Filed: May 14, 2021

(86) PCT No.: PCT/JP2021/018450
§ 371 (c)(1),
(2) Date: Nov. 23, 2022

(87) PCT Pub. No.: WO2021/241286
PCT Pub. Date: Dec. 2, 2021

(65) Prior Publication Data
US 2023/0212385 A1    Jul. 6, 2023

(30) Foreign Application Priority Data

May 27, 2020 (JP) ................................ 2020-092513

(51) Int. Cl.
*C08L 63/00* (2006.01)
*C08G 59/62* (2006.01)
*C08J 5/24* (2006.01)
*C08K 5/13* (2006.01)
*C08K 5/1545* (2006.01)
*C08K 5/3445* (2006.01)

(52) U.S. Cl.
CPC ............ *C08L 63/00* (2013.01); *C08G 59/621* (2013.01); *C08G 59/626* (2013.01); *C08J 5/24* (2013.01); *C08K 5/13* (2013.01); *C08K 5/1545* (2013.01); *C08K 5/3445* (2013.01); *C08J 2363/00* (2013.01)

(58) Field of Classification Search
CPC ........ C08L 63/00–10; C09D 163/00–10; C09J 163/00–10; C08J 2363/00–10; C08J 2463/00–10; C08G 59/00–72; C08K 5/1545
See application file for complete search history.

(56) References Cited

U.S. PATENT DOCUMENTS

| | | |
|---|---|---|
| 5,464,910 A | 11/1995 | Nakatsuka et al. |
| 2021/0253808 A1 | 8/2021 | Ushiyama et al. |
| 2022/0025106 A1 | 1/2022 | Kato et al. |

FOREIGN PATENT DOCUMENTS

| | | |
|---|---|---|
| EP | 0 118 270 A2 | 9/1984 |
| JP | S59-168023 A | 9/1984 |
| JP | H11-158350 A | 6/1999 |
| JP | 2000-351831 A | 12/2000 |
| JP | 2013-032510 A | 2/2013 |
| JP | 2015-083634 A | 4/2015 |
| JP | 2020-009922 A | 1/2020 |
| WO | WO-2020/100785 A1 | 5/2020 |
| WO | WO-2020/110493 A1 | 6/2020 |

OTHER PUBLICATIONS

European Extended Search Report issued in corresponding European Patent Application No. 21814371.7 dated Apr. 30, 2024 (6 pages).
International Searching Authority, "International Search Report," issued in connection with International Patent Application No. PCT/JP2021/018450, dated Jul. 6, 2021.
International Searching Authority, "Written Opinion," issued in connection with International Patent Application No. PCT/JP2021/018450, dated Jul. 6, 2021.

*Primary Examiner* — Kregg T Brooks
(74) *Attorney, Agent, or Firm* — Foley & Lardner LLP

(57) ABSTRACT

Provided is an epoxy resin composition containing an epoxy resin (A), a curing agent (B) and an imidazole adduct-type curing accelerator (C), in which the curing agent (B) contains a compound (B-1) represented by formula (B-1) [$R^1$ represents a hydrogen atom, a halogen atom, a methoxy group or a hydrocarbon group having 1 to 12 carbon atoms] and a compound (B-2) represented by formula (B-2) [$R^2$ represents a hydrogen atom, a halogen atom, a methyl group or a methoxy group] and the content of the compound (B-2) is 2 parts by mass or more and 5 parts by mass or less with respect to 100 parts by mass of the epoxy resin (A).

9 Claims, No Drawings

EPOXY RESIN COMPOSITION AND CURED PRODUCT THEREOF

CROSS-REFERENCE TO RELATED APPLICATIONS

The present application claims priority under 37 U.S.C. § 371 to International Patent Application No. PCT/JP2021/018450, filed May 14, 2021, which claims priority to and the benefit of Japanese Patent Application No. 2020-092513, filed on May 27, 2020. The contents of these applications are hereby incorporated by reference in their entireties.

TECHNICAL FIELD

The present invention relates to an epoxy resin composition and a cured product thereof.

BACKGROUND ART

Epoxy resins are applied to a variety of uses for fibrous reinforcing materials, electronic components, adhesives, paint, and the like since cured products thereof are excellent in terms of heat resistance, strength, chemical resistance, adhesion, and the like.

In a variety of uses, a composition containing an epoxy resin (hereinafter, referred to as "epoxy resin composition") normally contains a curing agent for curing the composition and further contains a curing accelerator in some cases [for example, Japanese Patent Laying-Open No. 2015-083634 (PTL 1) and Japanese Patent Laying-Open No. 2013-032510 (PTL 2)].

CITATION LIST

Patent Literature

PTL 1: Japanese Patent Laying-Open No. 2015-083634
PTL 2: Japanese Patent Laying-Open No. 2013-032510

SUMMARY OF INVENTION

Technical Problem

An epoxy resin composition is required to have characteristics in accordance with a use to which the epoxy resin composition is applied. Ordinarily, an epoxy resin composition is required to have a low viscosity and a long pot life from the viewpoint of workability. In addition, a cured product of an epoxy resin composition is required to have high heat resistance depending on a use to which the cured product is applied and is also required to have tensile characteristics in some cases.

An objective of the present invention is to provide an epoxy resin composition having a low viscosity and a long pot life and also being capable of yielding a cured product which exhibits favorable heat resistance, and a cured product thereof.

Solution to Problem

The present invention provides an epoxy resin composition, a cured product and the like to be described below.

[1] An epoxy resin composition containing an epoxy resin (A), a curing agent (B) and an imidazole adduct-type curing accelerator (C), in which the curing agent (B) contains a compound (B-1) represented by the following formula (B-1):

[Chem. 1]

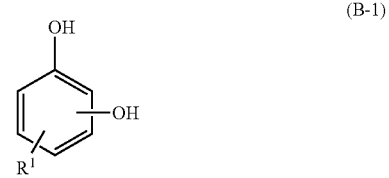

(B-1)

[in the formula, $R^1$ represents a hydrogen atom, a halogen atom, a methoxy group or a hydrocarbon group having 1 to 12 carbon atoms.] and
a compound (B-2) represented by the following formula (B-2):

[Chem. 2]

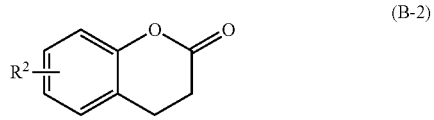

(B-2)

[in the formula, $R^2$ represents a hydrogen atom, a halogen atom, a methyl group or a methoxy group.], and
a content of the compound (B-2) is 2 parts by mass or more and 5 parts by mass or less with respect to 100 parts by mass of the epoxy resin (A).

[2] The epoxy resin composition according to [1], in which a mole ratio of a phenolic hydroxyl group content to an epoxy group content in the epoxy resin composition is 0.20 or more and 0.75 or less.

[3] The epoxy resin composition according to [1] or [2], in which a content of the compound (B-2) is 2.5 parts by mass or more and 4 parts by mass or less with respect to 100 parts by mass of the epoxy resin (A).

[4] The epoxy resin composition according to any one of [1] to [3], in which a ratio of a content of the compound (B-2) to a content of the compound (B-1) is 0.20 or more and 0.95 or less in terms of mass ratio.

[5] The epoxy resin composition according to any one of [1] to [4], in which the epoxy resin (A) contains an epoxy resin having two epoxy groups in a molecule.

[6] The epoxy resin composition according to any one of [1] to [5], further containing a Lewis acid compound (D) having a boron atom or an aluminum atom.

[7] A cured product of the epoxy resin composition according to any one of [1] to [6].

[8] A prepreg containing the epoxy resin composition according to any one of [1] to [6], and a fiber.

[9] A composition containing a cured product of the epoxy resin composition according to any one of [1] to [6], and a fiber.

Advantageous Effects of Invention

It is possible to provide an epoxy resin composition having a low viscosity and a long pot life and also being capable of yielding a cured product which exhibits favorable heat resistance, and a cured product thereof.

DESCRIPTION OF EMBODIMENTS

<Epoxy Resin Composition>

An epoxy resin composition according to the present invention (hereinafter, also referred to as "epoxy resin composition") contains the following components:
- an epoxy resin (A),
- a curing agent (B), and
- an imidazole adduct-type curing accelerator (C).

The curing agent (B) contains a compound represented by the formula (B-1) (hereinafter, also referred to as "compound (B-1)") and a compound represented by the formula (B-2) (hereinafter, also referred to as "compound (B-2)").

Hereinafter, each component that is contained or can be contained in the epoxy resin composition and the epoxy resin composition will be described in detail.

Unless particularly otherwise described, compounds that will be exemplified as each component that is contained or can be contained in the epoxy resin composition in the present specification can be used singly or in combination.

[1] Epoxy Resin (A)

The epoxy resin (A) is not particularly limited as long as the epoxy resin has one or more epoxy groups in the molecule, but the epoxy resin composition preferably contains an epoxy resin having two or more epoxy groups in the molecule and more preferably contains an epoxy resin having two epoxy groups in the molecule from the viewpoint of the curing property of the epoxy resin composition and the heat resistance, strength and the like of a cured product.

Examples of the epoxy resin having two or more epoxy groups in the molecule include aromatic glycidyl ether-type epoxy resins that can be obtained by a reaction between a polyvalent phenolic compound such as bisphenol A, bisphenol F, bisphenol AD, bisphenol S, biphenyl diol, naphthalenediol or a novolac resin that is obtained by condensing or polycondensing phenols and aldehydes, and epichlorohydrin;

aliphatic glycidyl ether-type epoxy resins that can be obtained by a reaction between a polyvalent alcohol compound such as 1,4-butanediol, 1,6-hexanediol, polyethylene glycol, polypropylene glycol, neopentyl glycol, glycerin, pentaerythritol or sorbitol and epichlorohydrin;

glycidyl ester-type epoxy resins that can be obtained by a reaction between a polybasic acid such as phthalic acid, hexahydrophthalic acid or dimer acid and epichlorohydrin;

glycidyl amine-type epoxy resins that can be obtained by a reaction between an amine such as aniline, toluidine, diaminodiphenylmethane, p-aminophenol or p-aminocresol and epichlorohydrin;

alicyclic epoxy resins that can be obtained by oxidizing an olefin-based compound having two or more unsaturated bonds in the molecule such as soybean oil or polybutadiene or a cyclic olefin compound having two or more unsaturated bonds in the molecule such as indene, 4-vinyl-1-cyclohexene or (3-cyclohexenyl) methyl 3-cyclohexene-1-carboxylate with a peracid (peracetic acid or the like);

and the like.

The above-exemplified epoxy resins can be an epoxy resin having two epoxy groups in the molecule.

Examples of the aromatic glycidyl ether-type epoxy resins having two epoxy groups in the molecule include bisphenol A-type epoxy resin, bisphenol F-type epoxy resin, bisphenol AD-type epoxy resin, bisphenol S-type epoxy resin, biphenyldiol-type epoxy resin and naphthalene diol-type epoxy resin.

Examples of the aliphatic glycidyl ether-type epoxy resins having two epoxy groups in the molecule include hydrogenated bisphenol A-type epoxy resin, 1,4-butanediol diglycidyl ether, 1,6-hexanediol diglycidyl ether, polyethylene glycol diglycidyl ether, polypropylene glycol diglycidyl ether and neopentyl glycol diglycidyl ether.

Examples of the glycidyl ester-type epoxy resins having two epoxy groups in the molecule include diglycidyl phthalate, diglycidyl hexahydrophthalate and dimer acid diglycidyl ester.

Examples of the glycidyl amine-type epoxy resins having two epoxy groups in the molecule include glycidylaniline, glycidyl toluidine and the like.

From the viewpoint of the viscosity of the epoxy resin, furthermore, the viscosity and curing property of the epoxy resin composition and the heat resistance, strength and the like of a cured product, the epoxy resin (A) preferably contains an aromatic glycidyl ether-type epoxy resin, more preferably contains a bisphenol-type epoxy resin and still more preferably contains a bisphenol A-type epoxy resin.

The epoxy resin (A) preferably contains a liquid epoxy resin, and, in a case where the epoxy resin (A) contains one or more epoxy resins, the epoxy resin (A) is more preferably liquid as a whole.

In the present specification, "liquid" means that fluidity is exhibited at 25° C. In the present specification, normally, a "liquid" substance is viscous, and, in a case where the viscosity cannot be measured with a viscometer in which an electromagnetic spinning method is used (EMS viscometer) or with an EMS viscometer, the viscosity can be 0.0001 Pa·s to 1000 Pa·s and may be 0.001 Pa·s to 500 Pa·s in terms of viscosity at 25° C. measured with an E-type viscometer.

A "liquid" substance can be in a state where one or more components are dispersed in a different component.

Examples of a case where the epoxy resin (A) is liquid as a whole include the following cases.
- a) A case where the epoxy resin (A) is composed of one liquid epoxy resin
- b) A case where the epoxy resin (A) is composed of a mixture of two or more liquid epoxy resins
- c) A case where the epoxy resin (A) is a mixture of one or more liquid epoxy resins and one or more solid epoxy resins and the mixture is liquid
- d) A case where the epoxy resin (A) is a mixture of two or more solid epoxy resins and the mixture is liquid Therefore, the epoxy resin (A) may contain a solid epoxy resin. In the present specification, "solid" means that a substance is solid at 25° C. The solid epoxy resin may be in a state of being dissolved or dispersed in a liquid epoxy resin. In order to cause a uniform curing reaction, the solid epoxy resin is preferably in a state of being uniformly dissolved.

From the viewpoint of adjusting the viscosity of the epoxy resin composition to a preferable range, the viscosity of the epoxy resin (A) (in a case where two or more epoxy resins are contained, the viscosity of a mixture of the two or more epoxy resins) is preferably 50 Pa·s or lower, more preferably 40 Pa·s or lower or still more preferably 20 Pa·s or lower in terms of viscosity at 25° C. measured with an EMS viscometer.

The viscosity of the epoxy resin (A) at 25° C. is normally 0.01 Pa·s or higher and may be 0.1 Pa·s or higher or may be 1 Pa·s or higher.

The viscosity of the epoxy resin (A) is preferably 0.01 Pa·s or higher and 50 Pa·s or lower, more preferably 0.1 Pa·s or higher and 40 Pa·s or lower or still more preferably 1 Pa·s or higher and 20 Pa·s or lower in terms of viscosity at 25° C. measured with the EMS viscometer.

The epoxy resin having two or more epoxy groups in the molecule may be used singly or two or more epoxy resins having two or more epoxy groups in the molecule may be jointly used.

The joint use of a bisphenol A-type epoxy resin and a biphenyl-type epoxy resin has an advantage in satisfying both favorable heat resistance and favorable tensile characteristics, which is preferable.

The epoxy resin (A) preferably contains an epoxy resin having two epoxy groups in the molecule.

The epoxy resin (A) may contain one or more epoxy resins selected from the group consisting of an epoxy resin having two epoxy groups in the molecule, an epoxy resin having one epoxy group in the molecule and an epoxy resin having three or more epoxy groups in the molecule.

The content of the epoxy resin having two epoxy groups in the molecule in the epoxy resin (A) is, for example, 50 parts by mass or more in 100 parts by mass of the epoxy resin (A) and is preferably 60 parts by mass or more, more preferably 70 parts by mass or more, still more preferably 80 parts by mass or more and far still more preferably 90 parts by mass or more from the viewpoint of the characteristics (heat resistance, tensile characteristics and/or the like) and the like of the cured product of the epoxy resin composition and may be 100 parts by mass.

The epoxy equivalent (in a case where two or more epoxy resins are contained, the epoxy equivalent of a mixture of the two or more epoxy resins) of the epoxy resin (A) is preferably 30 g/eq or more 500 g/eq or less, more preferably 40 g/eq or more 400 g/eq or less, still more preferably 50 g/eq or more 300 g/eq or less and far still more preferably 50 g/eq or more 250 g/eq or less from the viewpoint of the tensile characteristics, heat resistance, strength and the like of a cured product of the epoxy resin composition.

The epoxy equivalent of the epoxy resin can be measured according to JIS K 7236.

[2] Curing Agent (B)

The curing agent (B) contains a compound capable of cross-linking and curing of the epoxy resin (A). As the compound, the curing agent (B) contains a compound (B-1) represented by the formula (B-1) and a compound (B-2) represented by the formula (B-2).

The curing agent (B) may contain one compound (B-1) or may contain two or more compounds (B-1).

The curing agent (B) may contain one compound (B-2) or may contain two or more compounds (B-2).

In the formula (B-1), R' represents a hydrogen atom, a halogen atom, a methoxy group or a hydrocarbon group having 1 to 12 carbon atoms.

Examples of the halogen atom in 10 include a fluorine atom, a chlorine atom, a bromine atom and an iodine atom.

Examples of the hydrocarbon group having 1 to 12 carbon atoms in $R^1$ include aliphatic groups (alkyl groups and the like), alicyclic groups (cycloalkyl groups and the like), aromatic groups, hydrocarbon groups composed of a combination of an aliphatic group and an alicyclic group, hydrocarbon groups composed of a combination of an aromatic group and an aliphatic group and/or alicyclic group and the like.

The number of carbon atoms in the hydrocarbon group is preferably 1 to 8. From the viewpoint of the viscosity of the epoxy resin composition, the hydrocarbon group is a methyl group or a 1-phenylethyl group.

$R^1$ is preferably a hydrogen atom or a hydrocarbon group and more preferably a hydrogen atom.

The positional relationship between the two OH group in the compound (B-1) may be an ortho position, a meta position and a para position and is preferably an ortho position or a meta position and more preferably a meta position from the viewpoint of reducing the viscosity of the epoxy resin composition and the viewpoint of suppressing crystal precipitation in the epoxy resin composition.

The compound (B-1) is preferably a compound having a melting point of 150° C. or lower and more preferably a compound having a melting point of 130° C. or lower from the viewpoint of reducing the viscosity of the epoxy resin composition, the viewpoint of suppressing crystal precipitation in the epoxy resin composition and the viewpoint of lowering the dissolution temperature at the time of preparing the epoxy resin composition.

Examples of the compound (B-1) having a melting point of 150° C. or lower include catechol (1,2-dihydroxybenzene), resorcinol (1,3-dihydroxybenzene), 4-fluoro-1,3-dihydroxybenzene, 2-chloro-1,3-dihydroxybenzene, 4-chloro-1,3-dihydroxybenzene, 2-methoxy-1,3-dihydroxybenzene, 4-methoxy-1,3-dihydroxybenzene, 5-methoxy-1,3-dihydroxybenzene, 4-methyl-1,3-dihydroxybenzene, 5-methyl-1,3-dihydroxybenzene, 2-ethyl-1,3-dihydroxybenzene, 4-ethyl-1,3-dihydroxybenzene, 5-ethyl-1,3-dihydroxybenzene, 4-(1-phenylethyl)-1,3-dihydroxybenzene and the like.

In an epoxy resin composition according to one preferable embodiment, the compound (B-1) contains 1,3-dihydroxybenzene.

In the formula (B-2), $R^2$ represents a hydrogen atom, a halogen atom, a methyl group or a methoxy group.

Examples of the halogen atom as $R^2$ include a fluorine atom, a chlorine atom, a bromine atom and an iodine atom.

$R^2$ is preferably a hydrogen atom, a methyl group or a methoxy group and more preferably a hydrogen atom from the viewpoint of the melting point.

In an epoxy resin composition according to one preferable embodiment, the compound (B-1) contains 1,3-dihydroxybenzene, and the compound (B-2) contains dihydrocoumarin ($R^2$: hydrogen atom).

The content of the compound (B-2) is 2 parts by mass or more and 5 parts by mass or less with respect to 100 parts by mass of the epoxy resin (A).

According to the epoxy resin composition according to the present invention in which the content of the compound (B-2) is 2 parts by mass or more and 5 parts by mass or less with respect to 100 parts by mass of the epoxy resin (A), it is possible to exhibit a low viscosity and a long pot life and to yield a cured product exhibiting favorable heat resistance. From such a viewpoint, the content of the compound (B-2) is preferably 2.5 parts by mass or more and 4.5 parts by mass or less, more preferably 2.5 parts by mass or more and 4 parts by mass or less and still more preferably 2.5 parts by mass or more and 3.5 parts by mass or less with respect to 100 parts by mass of the epoxy resin (A). Containing a predetermined amount of the compound (B-2) can be advantageous since the tensile characteristics of the cured product can be enhanced.

When the content of the compound (B-2) in the epoxy resin composition is excessively decreased, the viscosity of the epoxy resin composition can be increased and/or the heat resistance of cured product can be degraded. When the content of the compound (B-2) in the epoxy resin composition is excessively increased, the pot life of the epoxy resin composition can become poor.

Containing the compound (B-1) in the epoxy resin composition is advantageous since the characteristics (heat resistance, tensile characteristics and/or the like) of the cured product of the epoxy resin composition can be improved.

The epoxy resin composition may further contain a compound having three or more phenolic hydroxyl groups. When the epoxy resin composition contains the compound, it is possible to improve the characteristics (heat resistance, tensile characteristics and/or the like) of the cured product of the epoxy resin composition in some cases.

Examples of the compound having three or more phenolic hydroxyl groups include compounds in which one of the hydrogen atoms that directly bond to the benzene ring in the compound (B-1) is substituted by a hydroxyl group, phenolic resins, novolac resins and the like.

The epoxy resin composition may contain a compound having one phenolic hydroxyl group. Examples of the compound having one phenolic hydroxyl group include phenol, cresol, xylenol, t-butylphenol and the like.

The mole ratio of the phenolic hydroxyl group content to the epoxy group content in the epoxy resin composition is, for example, 0.20 or more and 0.75 or less and preferably 0.25 or more and 0.67 or less, more preferably 0.3 or more and 0.6 or less, still more preferably 0.35 or more and 0.55 or less and far still more preferably 0.4 or more and 0.5 or less from the viewpoint of improving the characteristics (heat resistance, tensile characteristics and/or the like) of the cured product.

"The epoxy group content in the epoxy resin composition" refers to the number (mole number) of epoxy groups in the epoxy resin (A).

"The phenolic hydroxyl group content" is the phenolic hydroxyl group content in the epoxy resin composition and refers to the total of the number (mole number) of phenolic hydroxyl groups in the compound (B-1) and the number (mole number) of phenolic hydroxyl groups in a phenolic compound having the phenolic hydroxyl groups other than the compound (B-1).

The content of the compound (B-1) in the epoxy resin composition is preferably an amount at which the above-described mole ratio is within the above-described range and is, for example, 1 part by mass or more and 30 parts by mass or less, preferably 5 parts by mass or more and 25 parts by mass or less and more preferably 8 parts by mass or more and 22 parts by mass or less with respect to 100 parts by mass of the epoxy resin (A).

From the viewpoint of the curing property of the epoxy resin composition, the ratio of the content of the compound (B-2) to the content of the compound (B-1) in the epoxy resin composition is preferably 0.20 or more and 0.95 or less, more preferably 0.20 or more and 0.75 or less and still more preferably 0.20 or more and 0.50 or less in terms of mass ratio.

The epoxy resin composition may further contain an epoxy resin-curing agent that is different from the above-described curing agent. The different epoxy resin-curing agent may be a conventionally known curing agent.

Here, from the viewpoint of the viscosity or pot life of the epoxy resin composition and the characteristics (heat resistance, tensile characteristics and/or the like) of the cured product, the content of the different epoxy resin-curing agent in the curing agent (B) is preferably 20 parts by mass or less, more preferably 10 parts by mass or less, still more preferably 5 parts by mass or less and far still more preferably 1 part by mass or less (for example, 0 parts by mass) when the total amount of the curing agent (B) is set to 100 parts by mass.

[3] Imidazole Adduct-Type Curing Accelerator (C)

In the present specification, "curing accelerator" refers to an agent having a function of accelerating a curing reaction. "Acceleration" mentioned herein also includes a case where a curing reaction is initiated.

In the present invention, among curing accelerators, an imidazole adduct-type curing accelerator (C) is used. The use of the imidazole adduct-type curing accelerator (C) can be advantageous to satisfying both the pot life and curing property (fast curing property and the like) of the epoxy resin composition. This is assumed to be because the imidazole adduct-type curing accelerator (C) is capable of effectively initiating and/or accelerating the curing reaction between the epoxy resins (A) and the curing reaction among the epoxy resin (A), the compound (B-1) and the compound (B-2) and the imidazole adduct-type curing accelerator (C) is ordinarily latent and thus has an advantage of extending the pot life.

In addition, the use of the imidazole adduct-type curing accelerator (C) as the curing accelerator is advantageous since the curing reaction is enabled at relatively low temperatures and is also advantageous since the storage stability of the epoxy resin composition can be enhanced.

The imidazole adduct-type curing accelerator (C) may be used singly or two or more imidazole adduct-type curing accelerators (C) may be jointly used.

The fact that the imidazole adduct-type curing accelerator (C) is "latent" means that the imidazole adduct-type curing accelerator can be stably stored at room temperature (25° C.) even in the presence of the epoxy resin or in the presence of the epoxy resin and the curing agent and is also capable of generating a function of accelerating the curing reaction by heat, light, pressure or the like.

The imidazole adduct-type curing accelerator (C) that is used in the present invention is preferably capable of generating a function of accelerating the curing reaction by heat (thermally latent).

The imidazole adduct-type curing accelerator (C) is a compound obtained by adding an adduct to an imidazole compound. The latency is yielded by the addition of an adduct. The adduct is, for example, a compound capable of bonding to a N atom, preferably, an N atom in position 1 in an imidazole ring by a reaction with an imidazole compound. The bond is normally a covalent bond.

The adduct is preferably a compound capable of yielding favorable latency, and examples thereof include an epoxy compound, an isocyanate compound, a (meth)acrylic compound, a urea compound and the like.

The imidazole adduct-type curing accelerator (C) is preferably a polymer compound that can be obtained by reacting the adduct with an imidazole compound.

In addition, the adduct may be further made to form a solid solution with a phenolic resin or the like or may be surface-treated with an organic acid, a boric acid compound or the like.

Normally, the imidazole adduct-type curing accelerator (C) produced as described above is crushed into particle diameters of approximately 0.5 to 50 dispersed in an epoxy resin and used.

Ordinarily, the imidazole adduct-type curing accelerator (C) is poorly soluble in epoxy resins at normal temperature, and thus the imidazole adduct-type curing accelerator (C) mixed with an epoxy resin is thermally latent in many cases.

The imidazole adduct-type curing accelerator (C) can be produced by a method described in known patent literature, for example, Japanese Patent Laying-Open No. S59-053526, Japanese Patent Laying-Open No. S60-004524, Japanese Patent Laying-Open No. S60-072917, Japanese Patent Laying-Open No. 2005-206744, Japanese Patent Laying-Open No. H06-073156, Japanese Patent Laying-Open No. H06-172495, Japanese Patent Laying-Open No. 2008-214567, Japanese Patent Laying-Open No. 2014-177525 or the like.

As the imidazole adduct-type curing accelerator (C), a commercially available product may also be used. Examples of the commercially available product of the imidazole adduct-type curing accelerator (C) include "FUJICURE FXR-1020", "FUJICURE FXR-1030", "FUJICURE FXR-1032", "FUJICURE FXR-1081", "FUJICURE FXR-1121", "FUJICURE FXR-1131" (all manufactured by T&K TOKA Co., Ltd.); "ADEKA HARDENER EH-5011S", "ADEKA HARDENER EH-5046S" (manufactured by ADEKA Corporation); "CUREDUCT P-0505" (manufactured by Shikoku Chemicals Corporation); "AJICURE PN-23", "AJICURE PN-23J", ""AJICURE PN-31", "AJICURE PN-31J", "AJICURE PN-40", "AJICURE PN-40J", "AJICURE PN-50", "AJICURE PN-F", "AJICURE PN-H" (all manufactured by Ajinomoto Fine-Techno Co., Ltd.), all of which are trade names, and the like.

The epoxy resin composition may contain one or more different curing accelerators other than the imidazole adduct-type curing accelerator (C) as long as the effect of the present invention is not impaired.

The different curing accelerator is not particularly limited, and examples thereof include tertiary amine compounds and salts thereof, imidazole compounds (non-adduct type), imidazolium salts, phosphorus compounds such as triphenylphosphine and phosphonium salts, carboxylic acid metal salts, 2,3-dihydro-1H-pyrrolo[1,2-a]benzimidazole (TBZ) and the like.

From the viewpoint of more effectively developing the above-described effect, the content of the different curing accelerator in the curing accelerators is preferably 20 parts by mass or less, more preferably 10 parts by mass or less, still more preferably 5 parts by mass or less and far still more preferably 1 part by mass or less (for example, 0 parts by mass) when the total amount of the curing accelerators is set to 100 parts by mass.

The content of the imidazole adduct-type curing accelerator (C) in the epoxy resin composition is, for example, 1 part by mass or more and 50 parts by mass or less with respect to 100 parts by mass of the epoxy resin (A) and is preferably 2 parts by mass or more and 40 parts by mass or less, more preferably 3 parts by mass or more and 30 parts by mass or less, still more preferably 5 parts by mass or more and 20 parts by mass or less and far still more preferably 5 parts by mass or more and 15 parts by mass or less from the viewpoint of more effectively developing the above-described effect.

[4] Lewis Acid Compound (D)

The epoxy resin composition may further contain a Lewis acid compound (D) having a boron atom or an aluminum atom (hereinafter, also simply referred to as "Lewis acid compound (D)"). When the epoxy resin composition contains the Lewis acid compound (D), it becomes possible to further extend the pot life. In addition, when the epoxy resin composition contains the Lewis acid compound (D), it also becomes possible to obtain a cured product of the epoxy resin composition having favorable characteristics (heat resistance, tensile characteristics and/or the like) while extending the pot life without impairing the fast curing property.

The Lewis acid compound (D) is preferably liquid. The meaning of "liquid" is the same as described above.

The epoxy resin composition may contain one or more Lewis acid compounds (D).

The Lewis acid compound (D) is a compound represented by the following formula (1).

[Chem. 3]

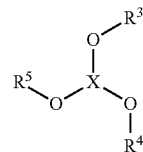

(1)

In the formula (1), X represents B (boron atom) or Al (aluminum atom). $R^3$, $R^4$ and $R^5$ are each independently a linear or branched alkyl group having 1 to 22 carbon atoms, an aryl group having 6 to 22 carbon atoms or a monovalent group represented by the following formula (2). $R^3$, $R^4$ and $R^5$ may be each substituted by an arbitrary substituent.

[Chem. 4]

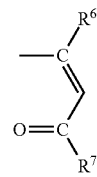

(2)

In the formula (2), $R^6$ and $R^7$ are each independently a linear or branched alkyl group having 1 to 22 carbon atoms, an aryl group having 6 to 22 carbon atoms or an oxyalkyl group having 1 to 22 carbon atoms. $R^6$ and $R^7$ may be each substituted by an arbitrary substituent.

In the formula (1), $R^3$, $R^4$ and $R^5$ are each independently preferably a linear or branched alkyl group having 1 to 22 carbon atoms or a group represented by the formula (2), more preferably a linear or branched alkyl group having 1 to 12 carbon atoms or a group represented by the formula (2) and still more preferably a linear or branched alkyl group having 2 to 8 carbon atoms or a group represented by the formula (2). $R^6$ and $R^7$ are each independently preferably a linear or branched alkyl group having 1 to 22 carbon atoms or an oxyalkyl group having 1 to 22 carbon atoms, more preferably a linear or branched alkyl group having 1 to 12 carbon atoms or an oxyalkyl group having 1 to 12 carbon atoms and still more preferably a linear or branched alkyl group having 2 to 8 carbon atoms or an oxyalkyl group having 1 to 8 carbon atoms.

Examples of the Lewis acid compound (D) where X in the formula (1) is B include triethyl borate, tri-n-propyl borate, tri-i-propyl borate, tri-n-butyl borate, tri-i-butyl borate, tri-sec-butyl borate, tri-t-butyl borate, tri-n-hexyl borate and tri-n-octyl borate.

Examples of the Lewis acid compound (D) where X in the formula (1) is Al include aluminum sec-butoxide, aluminum diisopropylate mono-sec-butylate, aluminum ethylacetoacetate diisopropylate, aluminum ethylacetoacetate diisopropylate, aluminum tris(ethylacetoacetate), aluminum monoacetylacetonate bis(ethylacetoacetate) and aluminum stearylacetoacetate diisopropylate.

In a case where the epoxy resin composition contains the Lewis acid compound (D), the content of the Lewis acid compound (D) in the epoxy resin composition is, for example, 0.01 parts by mass or more and 30 parts by mass or less with respect to 100 parts by mass of the epoxy resin (A) and is preferably 0.05 parts by mass or more and 20 parts by mass or less, more preferably 0.1 parts by mass or more and 10 parts by mass or less, still more preferably 0.2 parts by mass or more and 5 parts by mass or less and far still more preferably 0.3 parts by mass or more and 3 parts by mass or less from the viewpoint of more extending the pot life.

[5] Different Formulation Components

The epoxy resin composition may further contain different formulation components other than the above-described components.

Examples of the different formulation components include rubber particles, inorganic particles (particles made of metal such as aluminum or a metal compound such as calcium carbonate or silica), a flame retardant, a surface treatment agent, a release agent, an antibacterial agent, a leveling agent, an antifoaming agent, a thixotropic agent, a heat stabilizer, a light stabilizer, an ultraviolet absorber, a colorant, a coupling agent, a surfactant, a metal alkoxide (not belonging to the Lewis acid compound (D)), a thermoplastic resin, a diluent, barbituric acid and the like.

The different formulation component may be used singly or two or more different formulation components may be jointly used.

The addition of rubber particles makes it possible to improve toughness while maintaining favorable heat resistance in cured products of the epoxy resin composition.

Examples of the rubber particles include core-shell acrylic rubber particles, surface-modified acrylic rubber particles, crosslinked NBR particles, silicone rubber particles and the like. These rubber particles may be conventionally known rubber particles.

The average particle diameter of the rubber particles is, for example, 0.05 µm or more and 1 µm of less and preferably 0.2 µm or more and 0.5 µm or less.

Only one kind of rubber particles may be used singly or two or more kinds of rubber particles may be jointly used.

As the rubber particles, a commercially available product may be used or a dispersed product obtained by dispersing rubber particles in an epoxy resin in advance may be used. Examples of the commercially available product of the rubber particles or the dispersed product include "ACRYSET BPA328" (manufactured by Nippon Shokubai Co., Ltd.); "KANEACE MX-153", "KANEACE MX-154", "KANEACE MX-257", "KANEACE MX-960" (all manufactured by Kaneka Corporation); "STAFYROID AC" series (manufactured by Aica Kogyo Co., Ltd.); "PARALOID EXL" series (manufactured by Dow Inc.); "METABLEN" (manufactured by Mitsubishi Chemical Corporation); "XER-91" (manufactured by JSR Corporation); "GENIOPER LP52" (manufactured by Wacker Asahikasei Silicone Co., Ltd.), all of which are trade names, and the like.

The content of the rubber particles in the epoxy resin composition is, for example, 1 part by mass or more and 100 parts by mass or less with respect to 100 parts by mass of the epoxy resin (A) and is preferably 5 parts by mass or more and 80 parts by mass or less and more preferably 10 parts by mass or more and 50 parts by mass or less from the viewpoint of more effectively developing the above-described effect.

The content of the rubber particles in the epoxy resin composition is, for example, 1% by mass or more and 50% by mass or less with respect to the entire composition and is preferably 2% by mass or more and 30% by mass or less and more preferably 2% by mass or more and 20% by mass or less from the viewpoint of more effectively developing the above-described effect.

The addition of barbituric acid to the epoxy resin composition is advantageous to extend the pot life of the epoxy resin composition.

[6] Epoxy Resin Composition

The epoxy resin composition according to the present invention containing the epoxy resin (A), the compound (B-1), the compound (B-2), the imidazole adduct-type curing accelerator (C) and different components that are arbitrarily added is preferably liquid. The meaning of "liquid" is the same as described above.

In the liquid epoxy resin composition, all of the components that are contained in the epoxy resin composition may be in a dissolved state or one or more components may be in a state of being dispersed in a different component.

The liquid epoxy resin composition according to the present invention may have a low viscosity. The low viscosity makes it possible to improve the productivity and workability of products for which the epoxy resin composition is used. For example, since a method for producing a molding material (composition) containing a cured product of the epoxy resin composition, fibers and the like includes a step of impregnating fabric of fibers or a fiber bundle with the epoxy resin composition, the use of the epoxy resin composition having a low viscosity makes it possible to enhance the impregnating property of the epoxy resin composition.

The viscosity of the epoxy resin composition is preferably 50 Pa·s or lower, more preferably 40 Pa·s or lower, still more preferably 30 Pa·s or lower, far still more preferably 25 Pa·s or lower and particularly preferably 20 Pa·s or lower in terms of viscosity at 25° C. measured with the EMS viscometer. The viscosity of the epoxy resin composition at 25° C. is normally 0.01 Pa·s or higher and may be 0.1 Pa·s or higher or may be 1 Pa·s or higher.

The viscosity of the epoxy resin composition is preferably 0.01 Pa·s or higher and 50 Pa·s or lower, more preferably 0.1 Pa·s or higher and 40 Pa·s or lower or still more preferably 1 Pa·s or higher and 30 Pa·s or lower, far still more preferably 1 Pa·s or lower and 25 Pa·s or lower and particularly preferably 1 Pa·s or lower and 20 Pa·s or lower in terms of viscosity at 25° C. measured with the EMS viscometer.

The epoxy resin composition according to the present invention may have a long pot life. For example, the viscosity of the epoxy resin composition is preferably within the above-described range after the composition is stored for one day (24 hours) from the preparation at 25° C. In addition, the time taken for the viscosity of the epoxy resin composition to become twice the initial viscosity after the preparation of the composition is preferably as long as possible. The time taken for the viscosity to become twice the initial viscosity is normally approximately three days or longer, preferably five days or longer, more preferably six days or longer and still more preferably seven days or longer.

The epoxy resin composition according to the present invention is capable of exhibiting a favorable curing property. That is, the epoxy resin composition can be sufficiently cured within a relatively short thermal curing time and/or at a relatively low temperature.

<Cured Product>

A cured product according to the present invention is formed by curing the epoxy resin composition according to the present invention.

The cured product according to the present invention is a cured product of the epoxy resin composition according to the present invention and thus can have favorable heat resistance or can, furthermore, have favorable tensile characteristics.

The cured product according to the present invention is capable of showing a glass transition temperature of, for example, 110° C. or higher, furthermore, 115° C. or higher, furthermore, 120° C. or higher or, furthermore, 125° C. or higher.

For the cured product according to the present invention, elongation at break in the tensile characteristics in accordance with JIS K 7161-1 and JIS K 7161-2 can be, for example, 4.0% or more, furthermore, 5.0% or more, furthermore, 6.0% or more, furthermore, 7.0% or more or, furthermore, 7.5% or more.

The epoxy resin composition according to the present invention and the cured product thereof are excellent in terms of the heat resistance of the cured product or, furthermore, also excellent in terms of the tensile characteristics and thus can be applied to a variety of uses and can be used as, for example, an adhesive or a resin composition for sealing an electronic component or for impregnating a fiber. In addition, the epoxy resin composition according to the present invention has a low viscosity and an excellent impregnating property, is cured by heating within a short period of time (for example, 135° C. for 15 minutes), has excellent productivity and thus can be suitably used as a resin composition for sealing an electronic component or for impregnating a fiber.

The present invention also relates to a product or component including the cured product. An example of the product is a molded article (composition) containing the cured product, fibers and the like. The product or component including the cured product may contain a component other than a component derived from the epoxy resin composition (cured product) such as fibers.

A case where the epoxy resin composition according to the present invention is used as a resin composition for impregnating fibers will be described below.

As the fibers that are jointly used with the epoxy resin composition according to the present invention, fibers such as PAN-based carbon fibers, pitch-based carbon fibers, glass fibers, aramid fibers and kenaf fibers can be used. On the surface of the fibers, a known sizing treatment may be carried out.

As a method for complexing the epoxy resin composition according to the present invention and the fibers to produce a molded article, a known method can be used. Specific examples include a wet filament winding method in which the fibers are impregnated with an epoxy resin composition, wound around a mold such as a mandrel to be molded, heated and cured;

a dry filament winding method in which a tow prepreg obtained by pre-impregnating fibers with an epoxy resin composition is prepared, and the tow prepreg is wound around a mold such as a mandrel to be molded, heated and cured;

a resin transfer mold method in which fabric of fibers is produced, the fiber fabric is laminated in a die and pressed to produce a preform, and the preform is impregnated with an epoxy resin composition in a vacuum, heated and cured;

a sheet winding method in which a prepreg obtained by pre-impregnating fabric of fibers with an epoxy resin composition is prepared, wound around a mold such as a mandrel to be molded, heated and cured;

a press molding method in which a prepreg obtained by pre-impregnating fabric of fibers with an epoxy resin composition is prepared, and the prepreg is laminated in a die, heated and pressed with a pressing machine and cured;

an autoclave molding method in which a prepreg obtained by pre-impregnating fabric of fibers with an epoxy resin composition is prepared, the prepreg is placed on a molding jig, covered with a bag film, heated and pressed in an autoclave and cured;

and the like.

The present invention also provides a cured product of a prepreg containing the epoxy resin composition according to the present invention and fibers. An example of the cured product of the prepreg is a cured product of a prepreg obtained by pre-impregnating fibers or fabric of fibers with an epoxy resin composition (tow prepreg or the like). The cured product may be a cured molded article as mentioned above.

EXAMPLES

Hereinafter, the present invention will be more specifically described by showing examples, but the present invention is not limited by these examples. In the examples, "%" and "parts" expressing contents or amounts used are mass-based unless particularly otherwise described.

Examples 1 to 17 and Comparative Examples 1 to 8

(1) Preparation of Epoxy Resin Composition

Each component shown in Tables 1 to 4 below was mixed at formulation amounts shown in Tables 1 to 4 below to prepare epoxy resin compositions. In Tables 1 to 4, the unit of the formulation amount of each component is "parts by mass". In all of the examples and comparative examples, the obtained epoxy resin compositions were liquid (fluid at 25° C.).

In the "OH/EP mole ratio" rows of the Tables 1 to 4, the mole ratios of the phenolic hydroxyl group content to the epoxy group content in the epoxy resin compositions, which were calculated from the amounts charged, were recited. In addition, in the "Mass ratio of curing agent 2/curing agent 1" rows of the Tables 1 to 4, the mass ratios of the content of the curing agent 2 to the content of the curing agent 1 in the epoxy resin compositions were recited.

Rubber particles were formulated using a composition obtained by dispersing the rubber particles in an epoxy resin as a formulation component for preparing the epoxy resin compositions.

The detail of each formulation component shown in Tables 1 to 4 is as described below.

[a] Epoxy resin 1: An epoxy resin "jER 828" (bisphenol A-type epoxy resin, epoxy equivalent: 184 to 194 g/eq, viscosity: 12 to 15 Pa·s (25° C.)) that is contained in trade name "ACRYSET BP-328" manufactured by Nippon Shokubai Co., Ltd. (composition containing acrylic rubber particles dispersed in an epoxy resin)

[b] Epoxy resin 2: A liquid epoxy resin manufactured by Kukdo Chemical Co., Ltd., trade name "EPOKUKDO YD-127" (bisphenol A-type epoxy resin, epoxy equivalent: 180 to 190 g/eq, viscosity: 8 to 11 Pa·s (25° C.))

[c] Epoxy resin 3: A liquid epoxy resin manufactured by ADEKA Corporation, trade name "ADEKA RESIN EP-4300E" (bisphenol A-type epoxy resin, epoxy equivalent: 185 g/eq, viscosity: 8 Pa·s (25° C.))

[d] Epoxy resin 4: A solid epoxy resin manufactured by Mitsubishi Chemical Corporation, trade name "jER YX4000" (biphenyl-type epoxy resin, epoxy equivalent: approximately 190 g/eq, melting point: approximately 105° C.)

[e] Curing agent 1: 1,3-Dihydroxybenzene (resorcinol)

[f] Curing agent 2: Dihydrocoumarin

[g] Curing accelerator 1: An imidazole adduct-type curing accelerator manufactured by T&K TOKA Co., Ltd., trade name "FUJICURE FXR-1121" (latent)

[h] Curing accelerator 2: An imidazole adduct-type curing accelerator manufactured by ADEKA Corporation, trade name "ADEKA HARDENER EH-5011S" (latent)

[i] Curing accelerator 3: An imidazole-type curing accelerator manufactured by ADEKA Corporation, trade name "ADEKA HARDENER EH-4344" (latent)

[j] Curing accelerator 4: An imidazole-type curing accelerator manufactured by ADEKA Corporation, trade name "ADEKA HARDENER EH-5046" (latent)

[k] Curing accelerator 5: An imidazole-type curing accelerator manufactured by T&K TOKA Co., Ltd., trade name "FUJICURE FXR-1171" (latent)

[l] Rubber particles: Acrylic rubber particles that are contained in trade name "ACRYSET BP-328" manufactured by Nippon Shokubai Co., Ltd. (a composition containing acrylic rubber particles dispersed in the trade name "jER 828", which is an epoxy resin)

[m] Lewis acid compound 1: Triethyl borate

[n] Lewis acid compound 2: Tri-i-propyl borate

[o] Lewis acid compound 3: Tri-n-butyl borate

[p] Lewis acid compound 4: Tri-n-octyl borate

[q] Lewis acid compound 5: Aluminum ethylacetoacetate diisopropylate

[r] Lewis acid compound 6: Aluminum sec-butoxide (2) Evaluation of Epoxy Resin Composition And Cured Product Thereof (2-1) Viscosity and Pot Life of Epoxy Resin Composition For each of the epoxy resin composition immediately after preparation and the epoxy resin composition stored in a constant temperature reservoir at 25° C. for a predetermined period after preparation, approximately 2 g of the epoxy resin composition was sealed in a test tube together with a 4.7 mm aluminum spherical probe. This test tube was set in an EMS viscometer (EMS-1000) manufactured by Kyoto Electronics Manufacturing Co., Ltd. set to 25° C., and the viscosity of the epoxy resin composition was measured under conditions of a motor rotation speed of 1000 rpm, a measurement time of two minutes and measurement intervals of 30 seconds. The results are shown in Tables 1 to 4. In Tables 1 to 4, "–" means that the measurement was not carried out.

From the degree of the viscosity increased with respect to the storage period, the pot life can be evaluated.

(2-2) Curing Property of Epoxy Resin Composition

The epoxy resin composition was poured into a silicone die heated to 135° C., held at the same temperature for 15 minutes, and a curing reaction of the epoxy resin composition layer was carried out.

After the curing reaction, the silicone die was inclined, whether or not dripping occurred was visually confirmed, and the curing property (fast curing property) of the epoxy resin composition was evaluated according to the following evaluation standards. The results are shown in Tables 1 to 4.

A: Dripping does not occur, an epoxy resin composition layer after the curing reaction sufficiently cures, and the epoxy resin composition has a fast curing property.

B: Since dripping occurs, an epoxy resin composition layer after the curing reaction insufficiently cures, and the epoxy resin composition does not have a fast curing property.

(2-3) Glass Transition Temperature (Tg) of Cured Product

The epoxy resin composition was poured into a silicone die heated to 135° C., held at the same temperature for 15 minutes, and a curing reaction of the epoxy resin composition layer was carried out.

40 mg of an obtained cured product of the epoxy resin composition was weighed in an aluminum cell, and the glass transition temperature (Tg) was measured using a differential scanning calorimeter (DSAC-60A) manufactured by Shimadzu Corporation. The results are shown in Tables 1 to 4.

The middle point of the stepwise change of a DSC curve that was measured when the cured product was heated from 25° C. to 135° C. at a heating rate of 15° C./minute, held at 135° C. for 20 minutes, then, cooled from 135° C. to 30° C. at a cooling rate of −10° C./minute and, again, heated from 30° C. to 200° C. at a heating rate of 10° C./minute was regarded as Tg (° C.).

(2-4) Elongation at Break of Cured Product

For the cured product of the epoxy resin composition, the elongation at break in the tensile characteristics was measured according to JIS K 7161-1 and JIS K 7161-2.

Specifically, the epoxy resin composition was poured into a silicone die and cured under the same temperature conditions as in the (2-2), thereby obtaining a dumbbell test piece according to JIS K 7139A-2.

On the obtained test piece, a tensile test was carried out at a rate of 10 mm/minute using an autograph (AGX-10kNXplus) manufactured by Shimadzu Corporation according to JIS K 7161-1 and JIS K 7161-2. The results are shown in Tables 1 to 4. In the measurement of the elongation at break, the gauge length was calculated using a non-contact digital video extensometer (TRView).

(2-5) Fracture Toughness of Cured Product

For the 6 mm-thick cured product of the epoxy resin composition, the fracture toughness $K_{1C}$ was measured according to ASTM D5045-14.

Specifically, the epoxy resin composition was poured into a silicone die and cured under the same temperature conditions as in the (2-2), thereby obtaining a 6 mm×150 mm×150 mm cured product. A 6 mm×60 mm×12 mm test piece was produced from this cured product by cutting, a notch was formed with a 30° t1.0 double angle slicing blade, and then pre-crack processing was carried out.

On the pre-cracked test piece, a bending test was carried out using a universal material testing machine (5966 type) manufactured by Instron at a rate of 1 mm/min according to ASTM D5045-14, to measure the breaking load.

In addition, a 6 mm×150 mm×12 mm test piece was produced from the 6 mm×150 mm×150 mm cured product by cutting, a notch was formed with a 30° t1.0 double angle slicing blade, and then pre-crack processing was carried out.

On the pre-cracked test piece, a bending test was carried out using a universal testing machine 5966 type manufactured by Instron at a rate of 2.6 mm/min, and the 0.2% proof stress was measured.

The yield stress was substituted by the obtained 0.2% proof stress of the bending test, and the fracture toughness $K_{1c}$(MPa·m$^{1/2}$) was calculated. The results are shown in Tables 3 and 4.

The fracture toughness $K_{1c}$ was measured in Examples 8 to 10 and 14.

TABLE 1

|  |  |  | Comparative Example 1 | Comparative Example 2 | Example 1 | Example 2 | Example 3 | Comparative Example 3 |
|---|---|---|---|---|---|---|---|---|
| Epoxy resin (A) | Epoxy resin 1 | | 13.1 | 13.1 | 13.1 | 13.1 | 13.1 | 13.1 |
|  | Epoxy resin 2 | | 76.9 | 76.9 | 76.9 | 76.9 | 76.9 | 76.9 |
|  | Epoxy resin 3 | | | | | | | |
|  | Epoxy resin 4 | | 10.0 | 10.0 | 10.0 | 10.0 | 10.0 | 10.0 |
| Curing agent (B) | Curing agent 1 | | 10.8 | 10.8 | 10.8 | 10.8 | 10.8 | 10.8 |
|  | Curing agent 2 | | 0.0 | 1.0 | 2.0 | 3.0 | 5.0 | 10.0 |
|  | OH/EP mole ratio | | 0.37 | 0.37 | 0.37 | 0.37 | 0.37 | 0.37 |
|  | Curing agent 2/curing agent 1 mass ratio | | 0.00 | 0.09 | 0.19 | 0.28 | 0.46 | 0.93 |
| Curing accelerator (C) | Curing accelerator 1 | | | | | | | |
|  | Curing accelerator 2 | | 7.3 | 7.3 | 7.3 | 7.3 | 7.3 | 7.3 |
|  | Curing accelerator 3 | | | | | | | |
|  | Curing accelerator 4 | | | | | | | |
|  | Curing accelerator 5 | | | | | | | |
| Rubber particles | Rubber particles 1 | | 2.6 | 2.6 | 2.6 | 2.6 | 2.6 | 2.6 |
| Evaluation results | Composition | Viscosity (Pa·s) | | | | | | |
|  |  | Immediately after preparation | 27.7 | 24.0 | 22.5 | 20.0 | 19.8 | 12.8 |
|  |  | After one day | 29.5 | 30.3 | 25.9 | 23.7 | 22.7 | 18.6 |
|  |  | After two days | — | — | — | — | 26.6 | 26.5 |
|  |  | After three days | — | 36.5 | 29.2 | 28.2 | 29.6 | 37.1 |
|  |  | After four days | — | — | 31.0 | 30.1 | 31.5 | 43.6 |
|  |  | After five days | — | — | — | — | — | — |
|  |  | After six days | — | — | — | — | — | — |
|  |  | After seven days | — | — | — | — | — | — |
|  |  | Curing property | A | A | A | A | A | A |
|  | Cured product | Tg (° C.) | 103 | 121 | 126 | 126 | 125 | 125 |
|  |  | Elongation at break (%) | 5.9 | 7.0 | 7.9 | 7.6 | 10.5 | 8.2 |
|  |  | Fracture toughness (MPa) | — | — | — | — | — | — |

TABLE 2

|  |  | Example 4 | Comparative Example 4 | Example 6 | Example 7 | Comparative Example 5 |
|---|---|---|---|---|---|---|
|  |  |  |  | 5 |  |  |
| Epoxy resin (A) | Epoxy resin 1 | | | | | |
|  | Epoxy resin 2 | | | | | |
|  | Epoxy resin 3 | 100.0 | 100.0 | 100.0 | 100.0 | 100.0 | 100.0 |
|  | Epoxy resin 4 | | | | | |
| Curing agent (B) | Curing agent 1 | 10.8 | 10.8 | 21.7 | 21.7 | 21.7 | 21.7 |
|  | Curing agent 2 | 3.0 | 5.0 | 0.0 | 3.0 | 5.0 | 10.0 |
|  | OH/EP mole ratio | 0.37 | 0.37 | 0.75 | 0.75 | 0.75 | 0.75 |
|  | Curing agent 2/curing agent 1 mass ratio | 0.28 | 0.46 | 0.00 | 0.14 | 0.23 | 0.46 |
| Curing accelerator (C) | Curing accelerator 1 | | | | | | |
|  | Curing accelerator 2 | 7.2 | 7.2 | 7.2 | 7.2 | 7.2 | 7.2 |
|  | Curing accelerator 3 | | | | | | |
|  | Curing accelerator 4 | | | | | | |
|  | Curing accelerator 5 | | | | | | |

TABLE 2-continued

|  |  |  |  | Example 4 | Example 5 | Comparative Example 4 | Example 6 | Example 7 | Comparative Example 5 |
|---|---|---|---|---|---|---|---|---|---|
| Rubber particles |  | Rubber particles 1 |  |  |  |  |  |  |  |
| Evaluation results | Composition | Viscosity (Pa · s) | Immediately after preparation | 14.8 | 12.6 | 30.4 | 23.3 | 20.4 | 15.3 |
|  |  |  | After one day | 16.1 | 14.6 | 33.2 | 29.1 | 29.1 | 32.3 |
|  |  |  | After two days | 16.8 | 16.2 | — | 35.9 | 39.0 | 63.5 |
|  |  |  | After three days | — | — | — | — | — | — |
|  |  |  | After four days | — | — | — | — | — | — |
|  |  |  | After five days | 19.7 | 22.4 | — | — | — | — |
|  |  |  | After six days | 20.7 | 25.2 | — | — | — | — |
|  |  |  | After seven days | 21.8 | 28.6 | — | — | — | — |
|  |  | Curing property |  | A | A | A | A | A | A |
|  | Cured product | Tg (° C.) |  | 113 | 112 | 97 | 93 | 93 | 92 |
|  |  | Elongation at break (%) |  | 4.1 | 5.5 | 10.2 | 10.7 | 13.8 | 12.2 |
|  |  | Fracture toughness (MPa) |  | — | — | — | — | — | — |

TABLE 3

|  |  |  | Example 8 | Example 9 | Example 10 | Example 11 | Comparative Example 6 | Comparative Example 7 | Comparative Example 8 |
|---|---|---|---|---|---|---|---|---|---|
| Epoxy resin (A) | Epoxy resin 1 |  | 13.1 | 13.1 |  |  |  |  | 13.1 |
|  | Epoxy resin 2 |  |  |  |  |  |  |  |  |
|  | Epoxy resin 3 |  | 81.9 | 86.9 | 100.0 | 100.0 | 100.0 | 100.0 | 86.9 |
|  | Epoxy resin 4 |  | 5.0 |  |  |  |  |  |  |
| Curing agent (B) | Curing agent 1 |  | 10.8 | 10.8 | 9.0 | 9.0 | 9.0 | 9.0 | 10.8 |
|  | Curing agent 2 |  | 3.0 | 3.0 | 3.0 | 3.0 | 3.0 | 3.0 | 3.0 |
|  | OH/EP mole ratio |  | 0.37 | 0.37 | 0.31 | 0.31 | 0.31 | 0.31 | 0.37 |
|  | Curing agent 2/curing agent 1 mass ratio |  | 0.28 | 0.28 | 0.33 | 0.33 | 0.33 | 0.33 | 0.28 |
| Curing accelerator (C) | Curing accelerator 1 |  |  |  |  | 7.2 |  |  |  |
|  | Curing accelerator 2 |  | 7.2 | 7.2 | 7.2 |  |  |  |  |
|  | Curing accelerators |  |  |  |  |  | 7.2 |  |  |
|  | Curing accelerator 4 |  |  |  |  |  |  | 7.2 |  |
|  | Curing accelerators |  |  |  |  |  |  |  | 7.2 |
| Rubber particles | Rubber particles 1 |  | 2.6 | 2.6 |  |  |  |  | 2.6 |
| Evaluation results | Composition | Viscosity (Pa · s) Immediately after preparation | 19.2 | 17.0 | 14.6 | 15.4 | 16.0 | 35.8 | 24.7 |
|  |  | After one day | 21.6 | 19.5 | 17.5 | 17.5 | 27.1 | — | 70.3 |
|  |  | After two days | 23.5 | 21.3 | 19.8 | 18.7 | 39.9 | — | — |
|  |  | After three days | 25.2 | 23.0 | 21.1 | — | — | — | — |
|  |  | After four days | 26.7 | 24.5 | 22.4 | — | — | — | — |
|  |  | After five days | — | — | — | — | — | — | — |
|  |  | After six days | — | — | — | — | — | — | — |
|  |  | After seven days | 31.7 | 29.6 | 27.6 | 24.2 | — | — | — |
|  |  | Curing property | A | A | A | A | A | A | A |
|  | Cured product | Tg (° C.) | 119 | 119 | 118 | 126 | 123 | 125 | — |
|  |  | Elongation at break (%) | 6.7 | 7.6 | 6.8 | 4.0 | 5.6 | 7.8 | 7.1 |
|  |  | Fracture toughness (MPa) | 2.3 | 2.2 | 2.0 | — | — | — | — |

TABLE 4

|  |  | Example 12 | Example 13 | Example 14 | Example 15 | Example 16 | Example 17 |
|---|---|---|---|---|---|---|---|
| Epoxy resin (A) | Epoxy resin 3 | 100.0 | 100.0 | 100.0 | 100.0 | 100.0 | 100.0 |
| Curing agent (B) | Curing agent 1 | 11.6 | 11.6 | 11.6 | 11.6 | 11.6 | 11.6 |
|  | Curing agent 2 | 3.0 | 3.0 | 3.0 | 3.0 | 3.0 | 3.0 |
|  | OH/EP mole ratio | 0.40 | 0.40 | 0.40 | 0.40 | 0.40 | 0.40 |
|  | Curing agent 2/curing agent 1 mass ratio | 0.26 | 0.26 | 0.26 | 0.26 | 0.26 | 0.26 |

TABLE 4-continued

|  |  |  |  | Example | | | | | |
|---|---|---|---|---|---|---|---|---|---|
|  |  |  |  | 12 | 13 | 14 | 15 | 16 | 17 |
| Curing accelerator (C) |  | Curing accelerator 2 | | 7.2 | 7.2 | 7.2 | 7.2 | 7.2 | 7.2 |
| Lewis acid compound (D) |  | Lewis acid compound 1 | | 0.4 | | | | | |
|  |  | Lewis acid compound 2 | | | 0.5 | | | | |
|  |  | Lewis acid compound 3 | | | | 0.6 | | | |
|  |  | Lewis acid compound 4 | | | | | 1.1 | | |
|  |  | Lewis acid compound 5 | | | | | | 0.6 | |
|  |  | Lewis acid compound 6 | | | | | | | 0.6 |
| Evaluation results | Composition | Viscosity (Pa·s) | Immediately after preparation | 13.7 | 13.6 | 16.2 | 11.8 | 15.2 | 14.1 |
|  |  |  | After one day | 13.8 | 13.7 | 15.9 | 12.0 | 15.7 | 14.0 |
|  |  |  | After two days | 14.0 | 13.9 | 16.2 | 12.1 | 16.1 | 14.1 |
|  |  |  | After three days | | | 16.3 | | 16.4 | 14.2 |
|  |  |  | After four days | 14.2 | 14.2 | | 12.4 | | |
|  |  |  | After five days | | | 17.1 | | 16.8 | |
|  |  |  | After six days | | | 17.3 | | | |
|  |  |  | After seven days | | | | | | |
|  |  |  | After eight days | | | 17.9 | | 17.5 | 14.8 |
|  |  |  | After fourteen days | 15.4 | 15.7 | | 13.5 | | |
|  |  |  | After sixteen days | | | 20.1 | | 19.5 | 15.9 |
|  |  | Curing property | | A | A | A | A | A | A |
|  | Cured product | Tg (° C.) | | 114 | 115 | 109 | 111 | 109 | 107 |
|  |  | Elongation at break (%) | | 8.2 | 8.7 | 7.5 | 10.6 | 7.4 | 5.8 |
|  |  | Fracture toughness (MPa) | | — | — | 1.9 | — | — | — |

The invention claimed is:

1. An epoxy resin composition comprising:
an epoxy resin (A);
a curing agent (B); and
an imidazole adduct-type curing accelerator (C),
wherein the curing agent (B) contains a compound (B-1) represented by the following formula (B-1):

[Chem. 1]

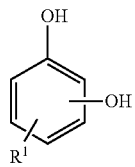

(B-1)

[in the formula, $R^1$ represents a hydrogen atom, a halogen atom, a methoxy group or a hydrocarbon group having 1 to 12 carbon atoms] and a compound (B-2) represented by the following formula (B-2):

[Chem. 2]

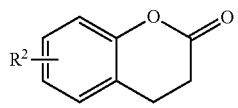

(B-2)

[in the formula, $R^2$ represents a hydrogen atom, a halogen atom, a methyl group or a methoxy group,] and
a content of the compound (B-2) is 2 parts by mass or more and 5 parts by mass or less with respect to 100 parts by mass of the epoxy resin (A).

2. The epoxy resin composition according to claim 1, wherein a mole ratio of a phenolic hydroxyl group content to an epoxy group content in the epoxy resin composition is 0.20 or more and 0.75 or less.

3. The epoxy resin composition according to claim 1, wherein a content of the compound (B-2) is 2.5 parts by mass or more and 4 parts by mass or less with respect to 100 parts by mass of the epoxy resin (A).

4. The epoxy resin composition according to claim 1, wherein a ratio of a content of the compound (B-2) to a content of the compound (B-1) is 0.20 or more and 0.95 or less in terms of mass ratio.

5. The epoxy resin composition according to claim 1, wherein the epoxy resin (A) contains an epoxy resin having two epoxy groups in a molecule.

6. The epoxy resin composition according to claim 1, further comprising a Lewis acid compound (D) having a boron atom or an aluminum atom.

7. A cured product of the epoxy resin composition according to claim 1.

8. A prepreg comprising the epoxy resin composition according to claim 1, and a fiber.

9. A composition comprising a cured product of the epoxy resin composition according to claim 1, and a fiber.

* * * * *

UNITED STATES PATENT AND TRADEMARK OFFICE
CERTIFICATE OF CORRECTION

PATENT NO. : 12,415,921 B2  
APPLICATION NO. : 17/927561  
DATED : September 16, 2025  
INVENTOR(S) : Kenichi Takeuchi and Hirofumi Kato Page 1 of 1

It is certified that error appears in the above-identified patent and that said Letters Patent is hereby corrected as shown below:

In the Claims

In Claim 1, Column 22, Line 29, please delete "a methyl group or a methoxy group,]" and replace with --a methyl group or a methoxy group.],--

Signed and Sealed this  
Twentieth Day of January, 2026

John A. Squires  
*Director of the United States Patent and Trademark Office*